Patented Mar. 1, 1932

1,847,330

UNITED STATES PATENT OFFICE

JOYCE H. CROWELL, OF BUFFALO, NEW YORK, ASSIGNOR TO NATIONAL ANILINE & CHEMICAL CO., INC., OF NEW YORK, N. Y., A CORPORATION OF NEW YORK

PROCESS OF MAKING CHLORINATED DERIVATIVES OF INDANTHRENE

No Drawing.    Application filed June 16, 1924.   Serial No. 720,288.

This invention relates to improvements in the manufacture and production of chlorine derivatives or substitution-products of N-di-hydro-1.2.2′.1′-anthraquinonazine.

It has been heretofore proposed to produce chlorinated derivatives of N-dihydro-1.2.2′.1′-anthraquinonazine, which is also known as indanthrene,

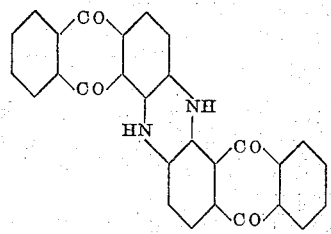

by subjecting it in sulfuric acid solution to the action of chlorine; but as hitherto carried out the process wastes large amounts of chlorine and produces derivatives of indanthrene which contain a relatively low percentage of chlorine, and which give dyeings, from an alkaline vat, which are only fast, if at all, toward a mild treatment of a weak bleaching solution, such as a solution of sodium or calcium hypochlorite.

It is well known that the qualities of the chlorinated indanthrenes, with respect to shade and to fastness toward bleaching solutions, as dyestuffs on the fibre, depend on and vary with their chlorine content and purity. Products giving dyeings whose shades are fast to bleaching solutions have hitherto been produced by special processes of chlorination in media other than sulfuric acid.

I have found that indanthrene can be successfully chlorinated in a comparatively short time with chlorine in the presence of sulfuric acid, by carrying out the chlorination under properly regulated and controlled conditions; and that the chlorination can thus be effected with little or no waste of chlorine and with the production of derivatives of indanthrene, in the azine, azhydrine or dihydro-azine form, or as a mixture of these forms, which contain as high as 11 to 14 percent of chlorine and whose dyeings, from an alkaline vat, are very resistant to the action of bleaching solutions. By controlling the extent of chlorination, less chlorinated derivatives can also be obtained. The present invention therefore permits the production of chlorinated indanthrenes susbtantially identical to known commercial products which contain about 5 to 14 percent of chlorine. These commercial products are comprised chiefly of either monochlor- or of dichlor-indanthrene, or of mixtures of the same, and they may be either in the azine, azhydrine, or dihydro-azine form.

According to the present invention, a well-agitated sulfuric acid solution or suspension of indanthrene is subjected to the action of chlorine until the desired amount of chlorine has been absorbed and a chlorinated indanthrene, or a derivative thereof, is produced which contains the desired percentage of chlorine and whose dyeings exhibit the desired shade and fastness toward bleaching solutions. The chlorine is supplied to the reaction-mass at about, or somewhat in excess of, the maximum rate at which it is absorbed in order to effect the chlorination in the minimum time and also to avoid undue waste of excessive amounts of chlorine. The invention can be carried out at pressures equal to or greater than atmospheric pressures.

The maximum absorption rate is defined as that rate at which the greatest or maximum amount of chlorine is taken up and absorbed by the sulfuric acid solution or suspension of indanthrene in a unit period of time. Its value is definite and specific for each set of conditions and depends on the currently existing combination of such factors as: (a) the temperature and the pressure at which the reaction is carried out, (b) the rate at which new surface areas of the solution or suspension are exposed or brought into contact with chlorine, (c) the strength of the sulfuric acid, (d) the concentration of the chlorine and of the indanthrene solution or suspension, and (e) the purity of the indanthrene.

When the rate at which chlorine is brought into contact with the indanthrene solution or suspension is less than the maximum rate of absorption, the rate of chlorination is lowered and the total time required to effect a given amount of chlorination is prolonged. If the chlorine is added at a greater rate than the maximum absorption rate, an increase in the maximum rate of absorption does not occur and the excess chlorine either remains unused or is wasted. The maximum rate of chlorination depends directly on the maximum rate of absorption.

I have found that the rate of absorption increases, within limits, with increase of temperature, of pressure, of agitation, of strength of sulfuric acid, of concentration of reacting substances, and of impurity of indanthrene. I have also found that the amount of chlorine required to effect a given amount of chlorination decreases, within limits, as the temperature and as the strength of the sulfuric acid increase, and increases as the purity of indanthrene decreases.

Since chlorine can act as both an oxidizing and chlorinating agent on indanthrene in the presence of sulfuric acid with formation of the azine and azhydrine forms, it is desirable at the completion of chlorination to reduce these forms to the dihydro-azine form in order to obtain a product having a uniform color. I have found that this reduction can be easily carried out in the sulfuric acid solution by means of ferrous salts, such as, for example, ferrous sulfate. After the reduction is effected, the dyestuff is either separated by crystallization and filtration or the mass is poured into water and the dyestuff, which is precipitated in minute and uniform particles, is filtered off and the paste either dried or standardized to any desired strength.

The following specific example will further illustrate the invention, but it is understood that the invention is not limited thereto. The parts are by weight.

Example: Dissolve 60 parts of indanthrene in 900 parts of well-stirred sulfuric acid of 66° Bé. strength at 50–60° C. in a steam-jacketed chlorination kettle equipped with an agitator and connected with a vent, and then raise the temperature of the solution to about 110°–120° C. Into this solution, kept well agitated and maintained at a temperature of about 110°–120° C., pass a current of chlorine, preferably through a diffuser, at a rate slightly in excess of that at which it is approximately absorbed, that is, about 85 to 90 percent or better of the chlorine passed in is absorbed. It is preferable that substantially all of the air in the apparatus be displaced by chlorine during the process. When a test sample shows the desired percentage of chlorine to be present, the addition of chlorine is discontinued, and the reaction-mass poured into about 8000 parts of warm or cold water, the solution or suspension heated to boiling and the precipitated coloring-matter collected by filtration.

The degree or extent of chlorination may be determined by analysis, or it may be estimated with sufficient accuracy for most practical purposes by diluting a test sample with water, filtering, and either comparing the color of the precipitated dye with samples of known composition, or by vating the precipitate by means of an alkaline sodium hydrosulfite solution and comparing the dyeings on cotton for shade and resistance to bleaching solutions against similar dyeings made from dyes of known composition. For the production of a chlorinated indanthrene which contains from 11 to 14 percent of chlorine in the isolated and purified dihydroazine form, and which is practically dichlorindanthrene, the chlorination is usually completed when a sample of the mixture on dilution with water gives a precipitate which is of a greenish-yellow color.

The chlorindanthrene thus obtained is usually in the form of the azhydrine or azine, with possibly some dihydro-azine or as a mixture of these forms. After isolation, it may be purified and transformed to the dihydroazine form by treating it with an alkaline sodium hydrosulfite solution and subsequently oxidizing it with air in the usual and well-known manner.

The azhydrine and azine form can be also readily converted into and obtained as the dihydro form as follows: When chlorination is completed, the reaction-mass is heated to about 125°–135° C. and 150 parts of crystallized ferrous sulfate added over a period of 10 to 20 minutes. After maintaining at this temperature for about an hour, or until a test shows the reduction to be complete, it is poured into about 4000 parts of hot water, boiled for about one-half hour, then diluted with an equal volume of cold water and the precipitate collected by filtration. The dyestuff thus obtained is in the dihydro-azine form and in a finely divided condition which is ready to be standardized to any desired strength. If desired, it can be purified in any well-known and suitable manner.

Instead of pouring the reduced mass into water it may be cooled to about room temperature whereby the dihydroazine crystallizes out as the sulfate which may be isolated by filtration or in any other suitable manner. This procedure effects a purification and gives a product exceptionally pure. When treated with water, the sulfate is decomposed and the dihydroazine produced as such.

If, in the above example, the chlorination is carried out at 60°–80° C. in place of 110°–120° C., then about 10 to 20 percent more time will be required to effect the same amount of chlorination.

In the above example, the time required to complete the chlorination will depend, among other things, very greatly on the efficiency of the agitation. The better the agitation, the less the time required. Ordinarily, with good agitation, about 4 to 8 hours will be required for the production of a chlorinated indanthrene which, in the purified dihydro-azine form, contains about 11 to 14 percent chlorine, while the amount of chlorine passed into the reaction-mixture will be about 20 to 40 parts, it depending on the purity of the indanthrene. Less time, and a smaller amount of chlorine will be required to produce chlorinated indanthrenes of less chlorine content. Further, the time of chlorination will be considerably lessened if the reaction is conducted under pressures greater than atmospheric pressure.

It to be understood that in the above example the proportions, concentrations, conditions of operation, etc., can be varied within comparatively wide limits without departing from the spirit and scope of the invention. For example, the strength of the sulfuric acid may vary from 85 to 100 percent and the amount employed may be about 5 to 25 parts for each part of indanthrene taken. Further, I have found that the rate at which the chlorine is absorbed is considerably higher, and the amount required is considerably less, at temperatures between 80° and 130° C. than it is at lower temperatures, say from 15° to 50° C. The reaction can be carried out first at the lower temperatures and then completed at the higher temperatures, or vice versa; or it may be carried out completely at the lower temperatures. Low temperatures favor the production of the azine and higher temperatures favor the production of the azhydrine forms, except when the product is chlorinated to the extent of about 14–15 percent in which case the azhydrine tends to be oxidized to the azine. Therefore, by completing the chlorination at low temperatures, that is, about 15° to 50° C., a chlorinated azine is the principal product obtained, while at higher temperatures, about 80° to 130° C., the chief product is usually a chlorinated azhydrine. Chlorination, therefore, can be effected at temperatures ranging from about 15° to about 130° C.

It is not necessary to pass the chlorine as a current of stream beneath the surface of the sulfuric acid since the chlorination is readily effected by simply bringing chlorine into contact with the upper surface of the solution provided said surface is well-agitated, and particularly if the chlorine be under pressures greater than atmospheric.

It is to be understood that indanthrene, or derivatives thereof, in the azine or azhydrine form, and irrespective of method employed in their production, can be reduced to the dihydro-azine form by treating them with ferrous salts in the presence of sulfuric acid, and said method of reduction is included as a part of this invention.

Further, low chlorine derivatives of indanthrene, that is, those containing less than 12 to 14 percent of chlorine, can be converted by the present invention to higher chlorinated products, and the present invention includes the chlorination of such bodies, whether in the azine, azhydrine or dihydroazine form, within its scope. In place of indanthrene, its azine and azhydrine forms may be employed as initial material, and in place of pure indanthrene, the mixture of dyestuffs obtained according to U. S. Patents 682,523 or 724,789 may be employed.

It will be thus seen that indanthrene, or its low chlorinated derivatives, in the azine, azhydrine or dihydroazine form, can be successfully and readily chlorinated without undue waste of chlorine and within a comparatively short time, for example, a few hours; that the extent or degree of chlorination is readily controlled thereby permitting the production of derivatives containing either a small amount of chlorine or a larger amount up to about 14 percent, and which includes the production of either monochlor- or dichlor-indanthrene; that the process permits the production of either the chlorinated azine or azhydrine as may be desired; and that the azine or azhydrine form, whether chlorinated or not, can be readily reduced to the dihydroazine form by means of ferrous salts in sulfuric acid solutions.

In the claims, it will be understood that the term "indanthrene body" denotes and includes the azine, the azhydrine, and the dihydroazine form of indanthrene and its mono-chlor derivatives; and that the term "oxidized indanthrene" denotes and includes the azine and the azhydrine form of indanthrene and its substitution-products.

I claim:

1. The production of a chlorindanthrene which comprises treating indanthrene in the presence of sulfuric acid with chlorine until chlorination is effected, and subsequently treating the resultant sulfuric acid reaction mixture with a ferrous salt.

2. In the chlorination of indanthrene by the action of chlorine on indanthrene in the presence of sulfuric acid, the step which comprises causing the action to occur at a pressure greater than atmospheric pressure.

3. As an improvement in the production of the dihydroazine form of an indanthrene, the process which comprises treating an oxidized indanthrene in sulfuric acid solution with ferrous sulfate and subsequently crystallizing out the dihydroazine form as the sulfate.

4. In the production of a halogen derivative of an indanthrene by subjecting the indanthrene to the action of a halogenating agent in the presence of sulfuric acid, the improvement which comprises subjecting the resultant sulfuric acid reaction-mixture at the completion of the halogenation to the action of a ferrous salt.

5. In the production of a chlorine derivative of an indanthrene by treating the indanthrene with chlorine in the presence of sulfuric acid, the improvement which comprises subjecting the resultant sulfuric acid reaction-mixture at the completion of the chlorination to the action of ferrous sulfate.

6. The method of producing a chlorine substitution-product of indanthrene, which comprises treating indanthrene with chlorine in the presence of sulfuric acid at a temperature of about 15° to 130° C., subjecting the resultant sulfuric acid reaction-mixture at the completion of the chlorination to the action of a ferrous salt at a temperature of about 125°–135° C., and subsequently diluting the mixture with water and recovering the precipitated chlor-indanthrene thus obtained.

7. In the production of an indanthrene, the process which comprises treating an oxidized indanthrene with a ferrous salt in the presence of sulfuric acid.

8. In the production of an indanthrene containing chlorine as a substituent, the process which comprises treating a chlorine derivative of an oxidized indanthrene with a ferrous salt in the presence of sulfuric acid.

9. The process of reducing an oxidized indanthrene to an indanthrene which comprises treating the oxidized indanthrene with ferrous sulfate in the presence of sulfuric acid.

10. The process for the production of a chlorindanthrene which comprises treating indanthrene in the presence of sulfuric acid with chlorine until chlorination is effected and subsequently treating the resultant sulfuric acid reaction mixture with a reducing agent.

11. In the production of a chlorine substitution-product of an indanthrene, the process which comprises treating inadanthrene with chlorine in the presence of sulfuric acid at a temperature of about 15° to about 130° C., and subjecting the resultant sulfuric acid reaction mixture to the action of a reducing agent.

12. In the production of a chlorine substitution-product of an indanthrene, the process which comprises subjecting indanthrene to the action of chlorine in the presence of sulfuric acid at a temperature of about 15° to about 130° C., and reducing the resultant sulfuric acid reaction mixture at the completion of the chlorination by the action of a ferrous salt.

13. The process of producing an N-dihydro-1.2.2′.1′-anthraquinoneazine, which comprises subjecting a 1.2.2′.1′-anthraquinoneazine to the action of a reducing agent in an acid medium.

14. The process of producing a halogen substitution-product of N-dihydro-1.2.2′.1′-anthraquinoneazine, which comprises subjecting a 1.2.2′.1′-anthraquinoneazine containing halogen as a substituent to the action of a ferrous salt in the presence of an acid medium.

15. The process of producing an N-dihydro-1.2.2′.1′-anthraquinoneazine, which comprises subjecting a 1.2.2′.1′-anthraquinoneazine to the action of a reducing agent in sulfuric acid.

In testimony whereof I affix my signature.

JOYCE H. CROWELL.